Oct. 23, 1962 H. P. COLBERT 3,059,688
MULTIPLE SHAFT TOOL HEAD
Filed Nov. 23, 1960 4 Sheets-Sheet 1

INVENTOR.
Harry P. Colbert
BY
*Roland A. Anderson*
ATTORNEY

INVENTOR.
Harry P. Colbert

United States Patent Office 3,059,688
Patented Oct. 23, 1962

3,059,688
MULTIPLE SHAFT TOOL HEAD
Harry P. Colbert, Paducah, Ky., assignor to the United States of America as represented by the United States Atomic Energy Commission
Filed Nov. 23, 1960, Ser. No. 71,362
6 Claims. (Cl. 153—79)

This invention relates to an improved tool head arrangement for the automatic expanding of a plurality of tubes simultaneously.

In tube bundles such as used in condensers, heat exchangers, coolers, heaters, boilers, and the like, a plurality of ferruled tubes are disposed in the ends of respective, endwise, perforated, tube sheets. The ferrule of each tube has to be expanded so as to lock it in position, thereby attaching the tubes securely within the endwise tube sheets. The normal procedure for expanding the ferruled tubes is a manual operation that utilizes an electrically operated "gun" which is adapted to operate a tapered mandrel carried by the gun. The mandrel is adapted to force a plurality of rollers against the inside wall of the tube ferrule. An operator is able to expand or "roll" only one ferrule of a tube at a time with the speed and quality of reproducibility of each "rolling" operation being dependent upon the skill and/or degree of fatigue of the operator. It should be apparent, therefore, that the above procedure of manually expanding or rolling ferruled tubes, individually, in a tube bundle requires the expending of a great many man-hours of operation per bundle, with the uniformity of the rolling procedure dependent upon the skill of the operator.

With a knowledge of the time consuming procedure in the individual, manual expanding of ferruled tubes in a tube bundle, and the skill required upon the part of an operator in carrying out the procedure, it is a primary object of this invention to provide a multiple tool head assembly that is capable of expanding a plurality of tubes simultaneously and automatically in a predetermined pattern, and permitting individual control of each expander of the tool head for each expanding cycle.

It is another object of this invention to provide a multiple tool head assembly for expanding a plurality of tubes simultaneously and automatically in a predetermined pattern, the tool head assembly being mounted on a positioning machine tool base to permit movement of the tool head in both the horizontal and vertical axes for the traversing of a tube bundle sheet in a programmed sequence of movements.

These and other objects and advantages of this invention will become apparent upon consideration of the following detailed specification and the accompanying drawings, wherein.

The above objects have been accomplished in the present invention by providing a tool head assembly in which a plurality of output shafts of a multiple spindle drill head are driven by a hydraulic motor. The output shafts are rotated simultaneously and in unison. A plurality of tube expanders are respectively coupled to the output shafts through individual power train arrangements. The axial motion or thrust force required for the rolling or expanding operation is provided by the power train arrangement for each expander and utilizes a double acting hydraulic cylinder having a hollow through shaft with the shaft cooperating with an internally rotatable splined shaft slidably coupled to a coupling rigidly attached to the respective output shaft of the aforementioned multiple drill head, thereby transmitting rotary motion and axial thrust simultaneously to the tube expander. A hydraulic power unit supplies hydraulic power to the hydraulic motor that drives the output shafts of the multiple drill head at constant speeds. The hydraulic power unit also supplies hydraulic power to each of the double acting hydraulic cylinders of the power train arrangements through respective two-position, four-way valves, under control of respective solenoids for each of the cylinders. The solenoids are in turn selectively controlled by a tool selection control unit which in turn is controlled by a signal or signals received from a programmed, coded tape from a tape reader. These control signals may be supplied by any other conventional programming unit, if desired. Thus, this invention should not be considered as limited to the use of a coded tape since the tape is only one convenient means for supplying the control signals. The number of expanders that are extended in a rolling operation is determined by a predetermined program of operations depending upon the arrangement of the tubes to be expanded in the tube bundle. The tool selection information as fed from the tape reader to the tool selection control unit is such as to automatically expand all of the ferruled tubes in a given section of the tube sheet in accordance with a programmed sequence of operations. A machine tool unit is provided for mounting and positioning the tool head assembly. The tape reader also supplies dimensional information to a machine tool servo control unit. The servo control unit in turn controls servo elements of the machine tool unit for imparting selected, horizontal and/or vertical movement to the tool head assembly on horizontal and vertical slide members.

Figure 1:
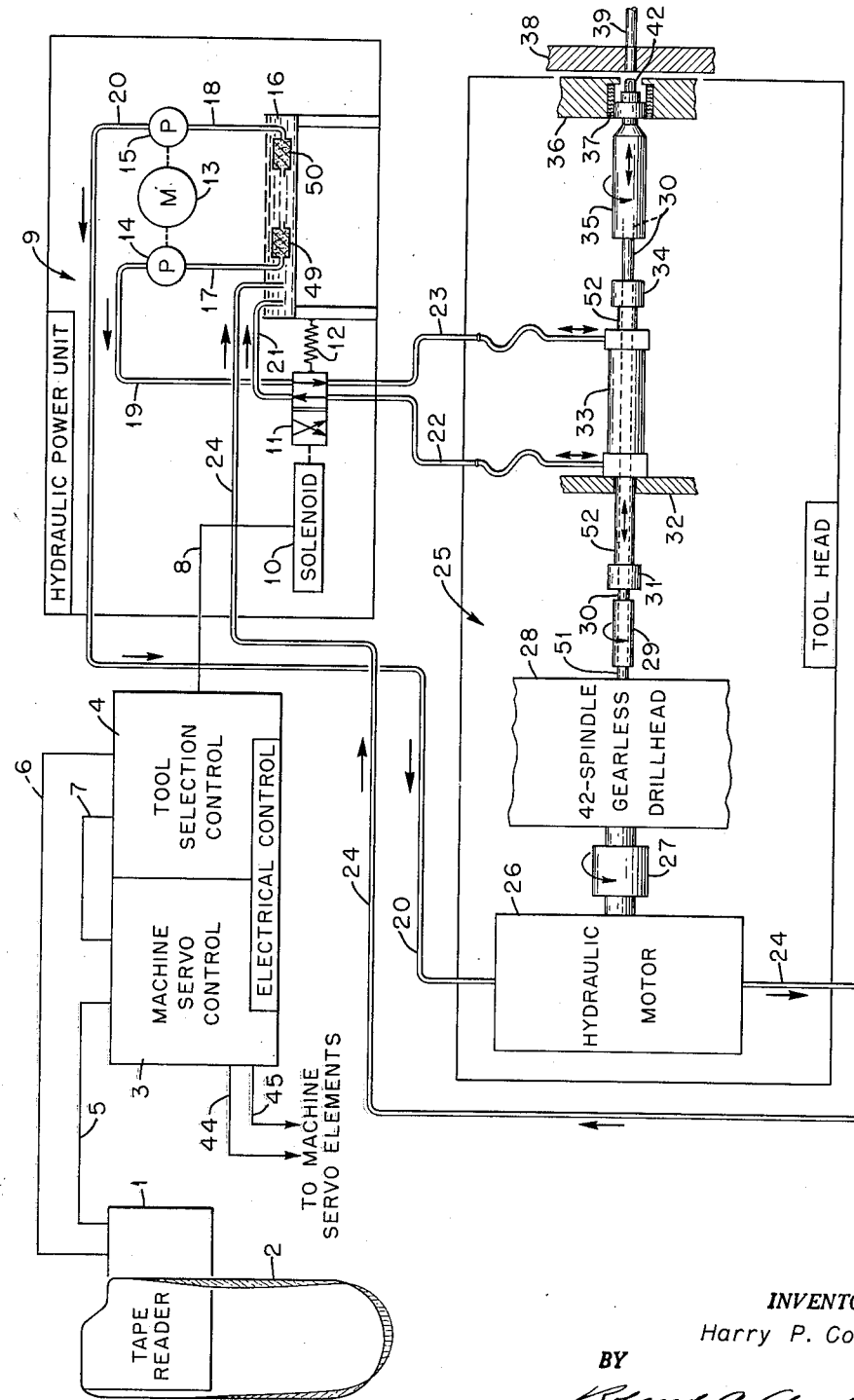
FIG. 1 is a schematic diagram of a system which illustrates one embodiment for carrying out the principles of this invention.

FIG. 1 illustrates one embodiment in which the principles of this invention may be carried out. A tool head assembly 25 includes a hydraulic motor 26 coupled to a 42-spindle gearless drill head 28 through a coupling 27. The drill head 28 has 42 output shafts 51, only one of which is shown, and these output shafts are rotated at a constant speed of about 300 r.p.m. Each of the output shafts 51 is rigidly attached to a splined female coupling 29, as more clearly seen in FIG. 3. Slidably engaged within each of the splined female couplings 29 is a splined shaft 30 which extends completely through the hollow shaft 52 of a hydraulic cylinder 33 and is coupled to a tapered mandrel 41 of a tube expander 35, as more clearly seen in FIG. 4, to rotate the same. The hollow shaft 52 of the hydraulic cylinder is bushed at both ends with anti-friction bearings suitably contained in adaptors 31 and 34, thereby permitting rotatable motion of the splined shaft 30 contained therein. The adaptors 31 and 34 support and maintain the rotatable splined shaft 30 coaxially aligned with the hollow shaft. It should be noted that the bearing contained within adaptor 34, as more clearly seen in FIG. 3, is suitably keyed to the rotatable splined shaft 30 therein permitting axial movement of this shaft as motivated by functioning of the hydraulic cylinder 33.

Figure 3:
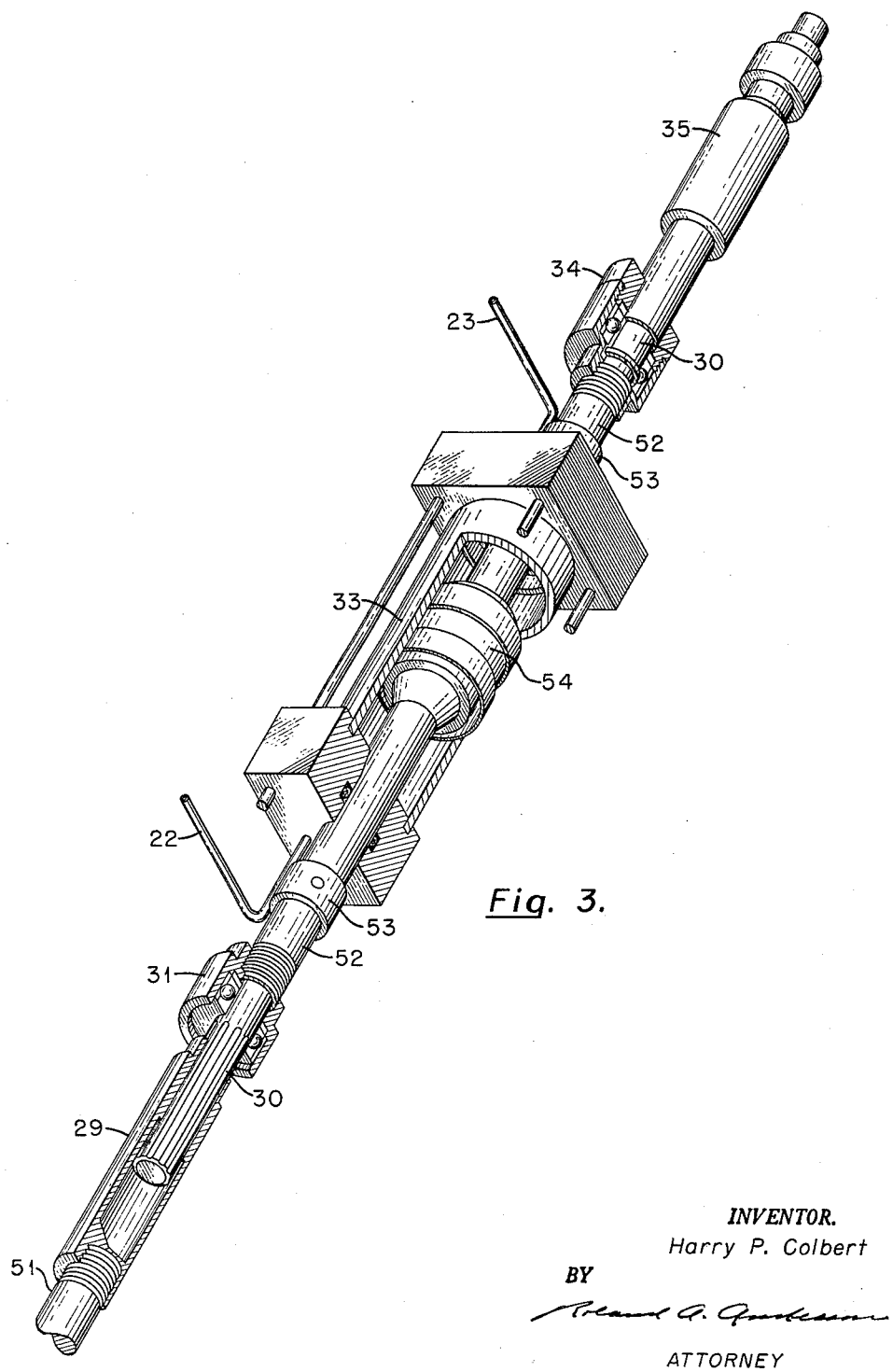
FIG. 3 is an isometric view with cutaway sections of the power train arrangement of FIG. 1; and, FIG. 4 is a partial sectional view of two of the expanders, the tube sheet, and tubes of the system of FIG. 1.

Disposed within the cylinder 33 is a double ended piston 54, FIG. 3, which is attached to the hollow shaft 52, and forming separate end chambers within the cylinder 33. Flexible plastic tubing 22 is connected to one of the end chambers of cylinder 33 and to a two-position, four-way valve 11. Flexible plastic tubing 23 is connected to the other of the end chambers of cylinder 33 and to the valve 11. The position of the valve 11 is controlled by the action of a solenoid 10 and a spring 12. In the valve position shown in FIG. 1, tubing 22 is connected to tubing 21 through the valve 11. Tubing 21 is in turn connected as a return to a reservoir 16 of the hydraulic power unit 9. Tubing 23 is connected to tubing 19 through the valve 11 in the position shown. Tubing 19 is in turn connected to a hydraulic pump 14 driven by an electric motor 13. Pump 14 receives hydraulic oil through a filter 49 and tubing 17 from the reservoir 16. In the other position of valve 11, tubing 22 is connected to tubing 19, and tubing 23 is connected to tubing 21. It can thus be seen that tubings 22 and 23 are alternately connected to the pump 14 and reservoir 16 each time the valve 11 changes its position. It should be apparent, therefore, that movement of the valve 11 controls the axial movement of the expander 35 of the tool head by the action of the hydraulic cylinder 33. To provide for the operation of a plurality of cylinders 33, manifolds (not shown) containing a suitable complement of outlets are interposed between the pump 14 and valves 11 and between valves 11 and reservoir 16.

Figure 2:
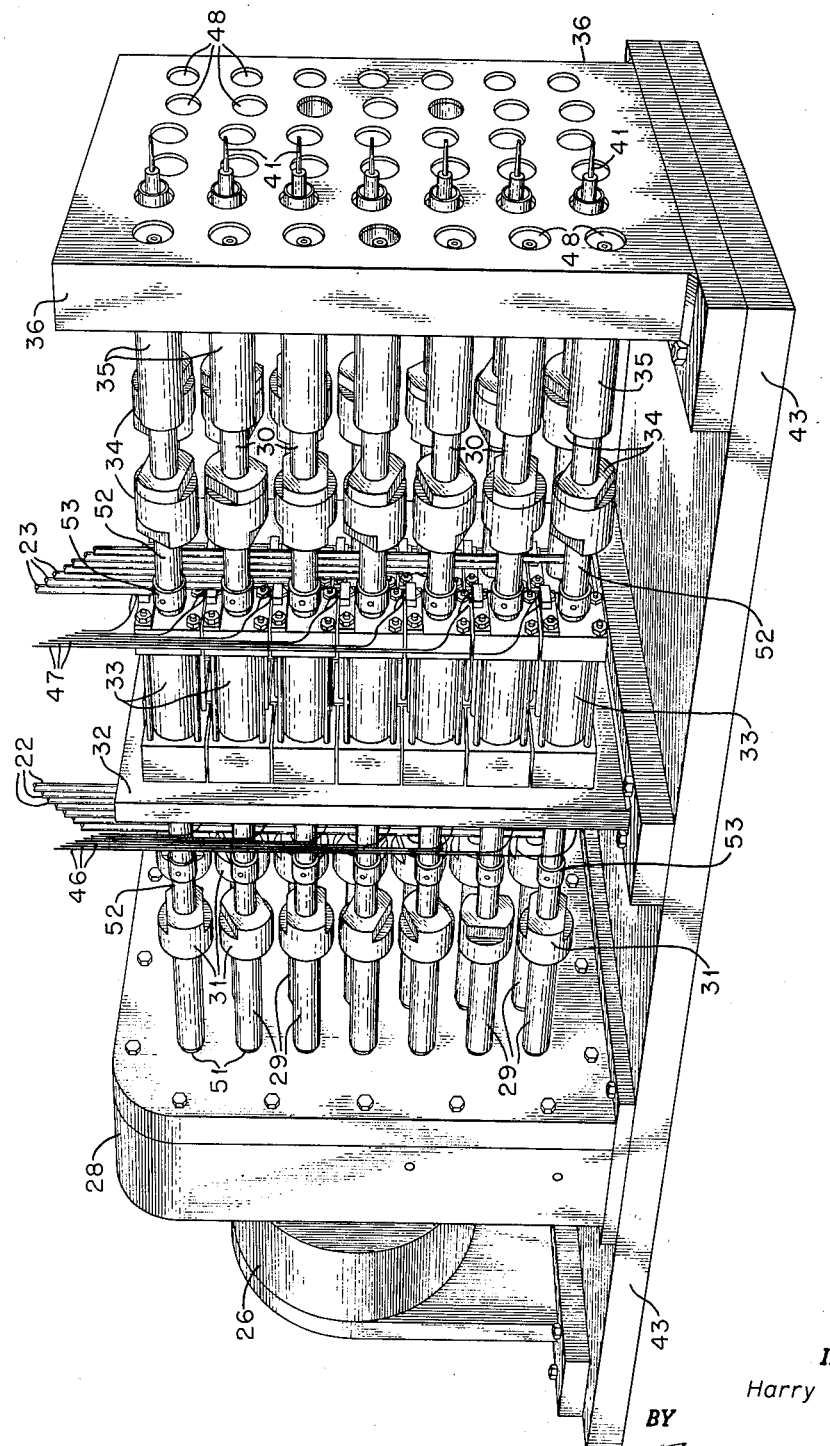
FIG. 2 is a partial view of the hydraulic motor, multiple spindle drill head, and the power train arrangement for some of the expanders of the system of FIG. 1.

A plate 32, as more clearly seen in FIG. 2, supports the cylinders 33 of the power train arrangements. A front plate 36 is provided with a plurality of openings 48, FIG. 2, through which the expanding ends of the expanders 35 extend. Each of the openings 48 in plate 36 is counterbored and each of these counterbores is lined with a suitable sleeve bearing 37 for supporting one end of each respective expander 35. Each bearing 37 is resiliently mounted thus permitting slight angular misalignments of the expander to compensate for nonuniformity of the tube sheet hole spacing.

The hydraulic motor 26 of FIG. 1 is connected by flexible tubing 20 to a hydraulic pump 15. Pump 15 is also driven by the electric motor 13. Hydraulic oil is supplied to pump 15 from the reservoir 16 through a filter 50 and tubing 18. The hydraulic oil from motor 26 is returned to reservoir 16 through flexible tubing 24. The reservoir is provided with about 200 gallons of a good grade of hydraulic oil. The reservoir 16 is provided with cooling coils, not shown, through which cooling water is circulated to maintain the temperature of the hydraulic oil about 100°–120° F. during normal operation.

Each of the 42 solenoids, only one of which is shown in FIG. 1, is connected by a respective line 8 to a tool selection control unit 4. A tape reader 1, through which a coded tape 2 is fed, supplies tool selection information to the control unit 4 through a connection 6. The tape reader 1 also supplies dimensional information to a machine servo control unit 3 through a line 5. The tool selection information and the dimensional information may be supplied by any other conventional programming unit, if desired. The servo control unit 3 is connected by leads 44 and 45 to machine servo elements of a machine tool, not shown. The horizontal and vertical positions of the tool head are controlled by these servo elements connected to leads 44 and 45. The servo control unit 3 is connected by a trigger lead 7 to the selection control unit 4. The purpose of this connection 7 is to delay the operation of the selected solenoids 10 until the tool head has been moved to the selected vertical and horizontal positions.

The motor 26, multiple drill head 28, plate 32, and end plate 36 are mounted on a common base 43, as seen in FIG. 2. A machine tool, not shown, which is conventional, is provided for effecting vertical and/or horizontal movement of the entire unit of FIG. 2. The machine tool is mounted on a bed complete with ways and feed screw for the positioning of the machine tool on the horizontal axis. The machine tool is provided with a vertically disposed slide and carries a saddle having a hydraulically actuated cross-slide for mounting of the tool head of FIG. 2 thereon. The vertical slide permits vertical positioning of the tool head unit by a servo element for the vertical traversing of the tube sheet. The traversing of the tube sheet in a horizontal plane is provided by the horizontal positioning by a servo element of the machine tool upon its base. However, the horizontally actuating cross-slide, upon which is mounted the tool head unit, is utilized for the advancement and positioning of the tool head unit up to the tube sheet during the functioning of the system. The machine tool is a conventional, commercial unit and may be the Cincinnati Sculpto-Form Mill No. 2, for example. The machine tool servo elements connected to leads 44 and 45 of FIG. 1 are used for controlling the vertical and/or horizontal movement of the unit of FIG. 2. Only 14 of the 42 power train arrangements are shown in FIG. 2 for the sake of clarity. Plastic tubings 22 and 23 are shown only for the first vertical row of the power train arrangements. Electrical leads 46 are connected to respective limit switches, not shown, which are provided for signalling when each expander is fully extended. Electrical leads 47 are connected to respective limit switches as shown for signalling when each expander is retracted. These limit switches are actuated by sleeve members 53 which are affixed to the hollow shaft 52 as shown in FIG. 2 and FIG. 3.

Figure 4:
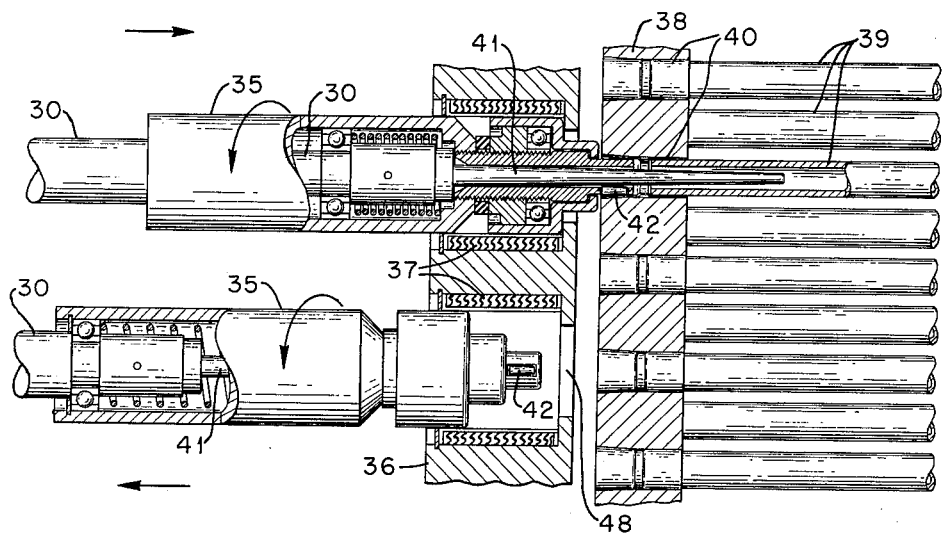

The manner in which each of the shafts 30 is coupled to its respective mandrel 41 is more clearly shown in FIG. 4. As shown in FIG. 4, the front plate 36 is positioned during an expanding operation in close proximity to the endwise tube sheet 38 in which a plurality of ferruled tubes 39 are positioned. Each tube 39 is provided with a ferrule 40 which is expanded in a hole in tube sheet 38 by action of rollers 42 and the axial and rolling movement of the tapered mandrel 41 as it is extended by the expander 35 in a rolling operation. As the rolling operation is completed, the length of which is controlled by an electrical timing device, not shown, a signal is provided by the timer to effect movement of the tool head to a new position. (The time cycle is started at the same moment that the tools start to advance.) The number of expanders that are operated in each rolling operation is determined by the signals received from the coded tape 2. The tape is coded in a predetermined manner such as to automatically expand in a sequence of operations all of the tube ferrules of a given section of the endwise tube sheet. After a section has been completely expanded, the tube sheet 38 is then moved to a new section with respect to the tool head and the procedure repeated until the ferruled tubes of this new section have been expanded. This procedure is repeated until all of the ferruled tubes in the sheet 38 have been expanded. The position of the tube bundle is then reversed and the ferruled tubes are then expanded in the opopsite endwise tube sheet in the same manner.

In a typical operation of the power train arrangements described above, the rotary motions of the selected expanders 35 are supplied through the slidably engaged splined shafts 30, and all motivation of the expanders for the entry into and exit from the ferruled tubes will be supplied by the hydraulic cylinders 33. The cylinders advance and retract their hollow shafts and the splined shafts keyed therewith, thereby advancing and retracting the tapered mandrels 41 of the expanders. Each selected hydraulic cylinder is actuated by hydraulic power through suitable plastic tubing from the hydraulic power unit 9, as described above. As the selected expanders are advanced forward, the cylindrical front portions of the expanders, being slidably engaged in the resiliently mounted sleeve bearings 37 of the counterbores of the front plate 36, advance until they come to bear against the counterbore shoulders, and the roller cage portions of the expanders extend beyond the front plate 36, as shown in FIG. 2 and FIG. 4, and are positioned within the ferrules of the tube sheet prior to the rolling operation. The rolling operation is accomplished by the continued axial forward movement of the selected, rotating splined shafts 30, as advanced by the hydraulic cylinders 33, until the expander mandrels move forward sufficiently to force the rolls 42 of the expanders into an interference fit with the ferrules thereby expanding or rolling the ferrules in the tube sheet holes. In operation of the power train arrangements, minimal thrust force is imparted to the tube sheet since the reciprocating action of the hydraulic cylinders is virtually all absorbed within the tool head front plate 36.

According to a predetermined programmed sequence or pattern of "rolling," any number of expanders from 1 to 42 will be automatically advanced by control means at the hydraulic power unit, thereby causing the corresponding numbered cylinders to actuate their respective expanders. The completion of the rolling operation is determined by hydraulic pressure signals and timing devices, by means not shown, which terminate the axial force being transmitted to the expanders.

The above-described sequence of functions and operations is continued until all of the tubes in the section which can be covered by the tool head, by minor shifts of the tool head in both the vertical and horizontal axes, are rolled. In the rolling operation of some tube bundles where the tubes are closely spaced, the minor shifts are required to position the tool head for rolling adjacent holes which were not rolled during the preceding rolling operation because the expander tool spacing is greater than the tube hole spacing. When all the holes in one section have been rolled, then a major shift of the tool head to an adjacent section is made and the sequence will be repeated, etc., until the whole tube sheet has been rolled. In some rolling operations, the tube sheet hole pattern is sector-shaped and not all of the 42 tools are advanced for each position of the tool head because the expander pattern is rectangular. The tape which controls the operation of the device is punched with a binary system of numerical and positioning information in accordance with the hole pattern of the tube sheet to be rolled.

This invention has been described by way of illustration rather than limitation and it should be apparent that this invention is equally applicable in fields other than those described.

What is claimed is:

1. A system for automatically expanding a plurality of ferruled tubes in a tube sheet simultaneously and in a predetermined pattern and sequence of operations comprising a tool head, a multiple drill head provided with a single input shaft and a plurality of output shafts, said drill head being mounted on said tool head; motor means connected to said input shaft for driving the input shaft at a constant speed, said motor means being mounted on said tool head; a plurality of tube expanders, each of said expanders being provided with a roller cage with tube rollers and a tapered mandrel; a rotatable shaft coupled to each of said mandrels of each of said expanders; a splined coupling for coupling each of said rotatable shafts to an output shaft of said multiple drill head; a hollow shaft disposed about each of said rotatable shafts between each of said splined couplings and each of said expanders; a pair of bearing means being mounted between each of said hollow shafts and each of said rotatable shafts, one of said bearing means being keyed to said hollow shaft and said rotatable shaft; a hydraulic cylinder disposed about each of said hollow shafts and being provided with a double-ended piston affixed to and about said hollow shaft; vertically and horizontally disposed slide members; means for mounting said tool head on said slide members; a first control means connected to said cylinders for operating a selected group of said cylinders; a programmed device; means for deriving a first group of signals and a second group of signals from said device; means for transmitting said first signals to said first control means to thereby control a selected group of said expanders to move each of said selected group of said expanders and their mandrels in axial directions with respect to said tube rollers in a predetermined tube expanding operation, a second control means; servo means electrically connected to said second control means and mechanically connected to said tool head for moving said tool head to predetermined horizontal and vertical positions; means for transmitting said second signals to said second control means to thereby position said tool head at a predetermined horizontal and vertical position; and means responsive to completion of each expanding operation and acting in cooperation with said second control means to shift said tool head to a new position before a subsequent expanding operation is begun to expand another selected group of said tubes.

2. The system set forth in claim 1, wherein said programmed device includes a coded punched tape.

3. The system set forth in claim 1, wherein there is provided means connected between said first control means and said second control means to delay the operation of said first control means until said second control means has operated to position said tool head at a selected, predetermined position prior to each expanding operation.

4. The system set forth in claim 1, wherein said motor means is a hydraulic motor, said system further including an oil reservoir, and means for pumping oil from said reservoir to said motor and then back to said reservoir.

5. The system set forth in claim 1, wherein said first control means include a two-position, four-way valve connected to each of said hydraulic cylinders at the opposite ends of said double-ended piston, a solenoid connected to each of said valves, the actuation of selected ones of said solenoids being controlled by said first signals, and means for pumping hydraulic oil through each of said valves to each of said selected hydraulic cylinders to thereby effect axial movement of each of said rotatable shafts and the mandrels connected thereto in a tube expanding operation.

6. An improved device for expanding a ferruled tube disposed in a tube sheet comprising a stationary mounted drill head provided with an input shaft and an output shaft, means for driving said input shaft at a constant speed to thereby drive said output shaft at a constant speed, a tube expander provided with a roller cage with tube rollers and a tapered mandrel, a rotatable shaft rigidly coupled to said mandrel, a splined coupling for coupling said rotatable shaft to said output shaft, a hollow shaft disposed about said rotatable shaft between said splined coupling and said expander, said hollow shaft being spaced from said rotatable shaft by a pair of bearing means, one of said bearing means being keyed to said hollow shaft and said rotatable shaft and acting as a thrust bearing, a hydraulic cylinder disposed about said hollow shaft and being provided with a double-ended piston affixed to and about said hollow shaft to define separate end chambers within said cylinder, a source of hydraulic fluid, means for supplying said hydraulic fluid alternately to each of said chambers to thereby extend and retract axially said hollow shaft and the rotatable shaft keyed thereto, said rotatable shaft and the mandrel of the expander affixed thereto effecting a radially outward movement of said tube rollers when said mandrel is axially extended to thereby effect the rolling of said ferruled tube in said tube sheet.

References Cited in the file of this patent

UNITED STATES PATENTS

| | | |
|---|---|---|
| 1,000,122 | Reynolds | Aug. 8, 1911 |
| 2,690,205 | Stary | Sept. 28, 1954 |